M. J. TODD.
STEERING MECHANISM FOR ROAD FREIGHT CARS.
APPLICATION FILED MAR. 9, 1910.
981,499.
Patented Jan. 10, 1911.
2 SHEETS—SHEET 1.
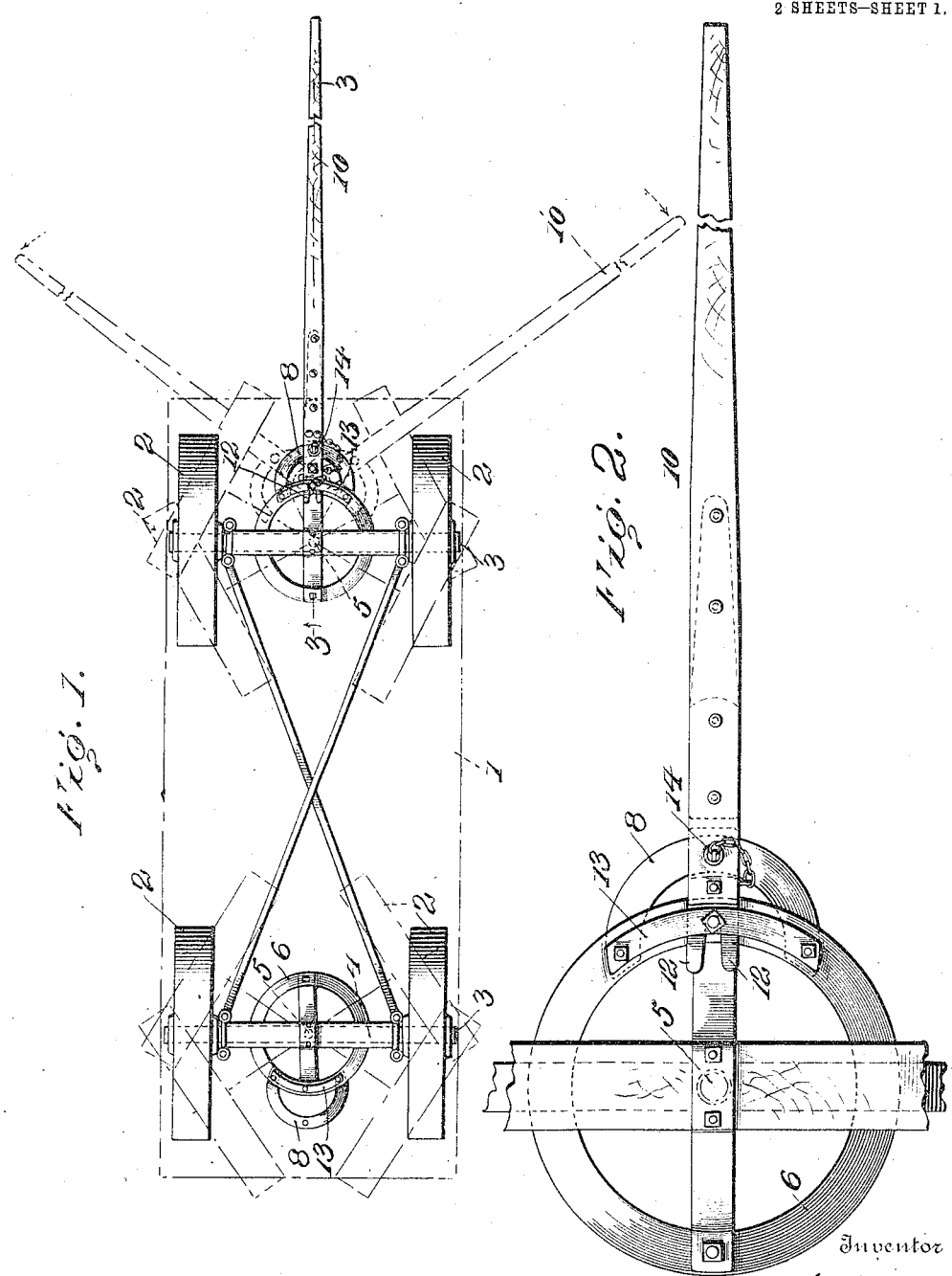

M. J. TODD.
STEERING MECHANISM FOR ROAD FREIGHT CARS.
APPLICATION FILED MAR. 9, 1910.
981,499.
Patented Jan. 10, 1911.
2 SHEETS—SHEET 2
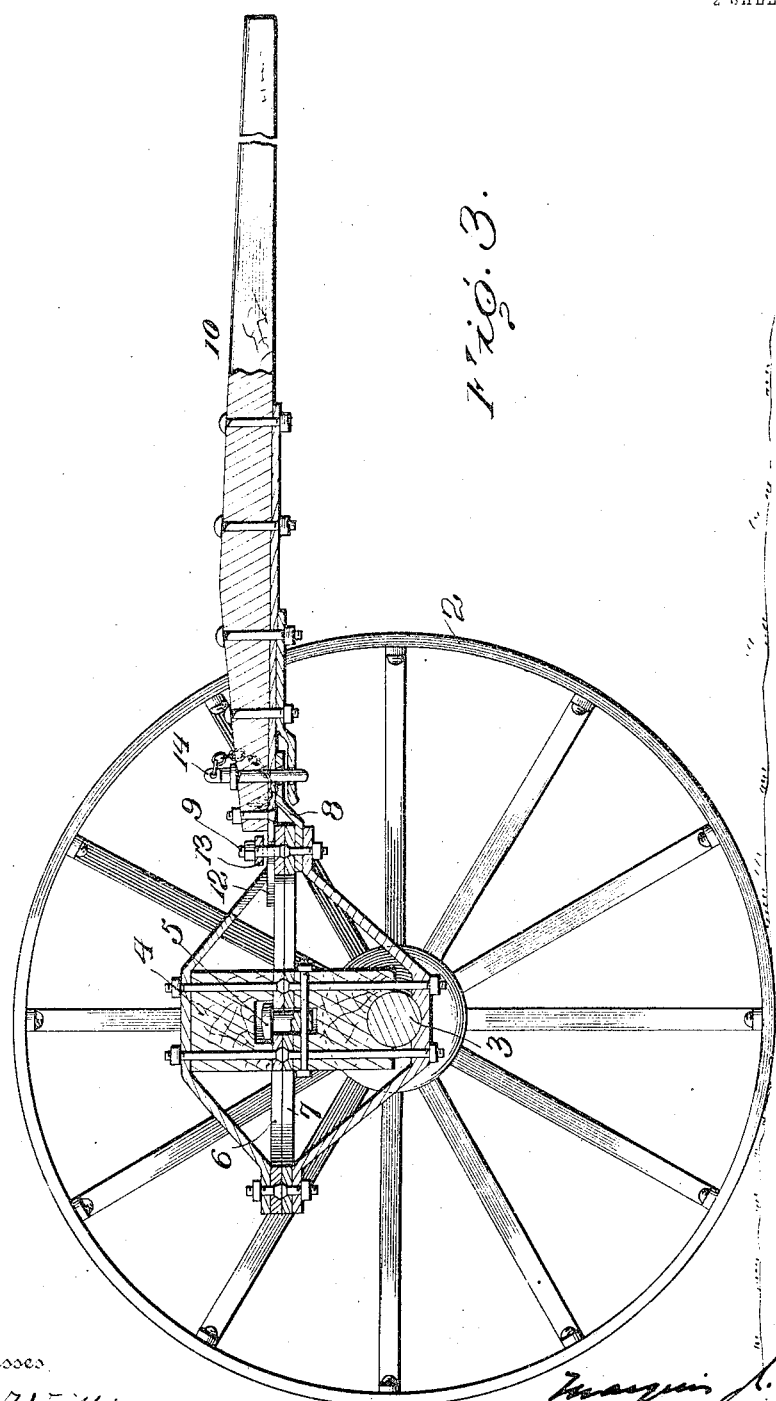

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

STEERING MECHANISM FOR ROAD FREIGHT-CARS.

981,499. Specification of Letters Patent. Patented Jan. 10, 1911.

Application filed March 9, 1910. Serial No. 548,281.

*To all whom it may concern:*

Be it known that I, MARQUIS J. TODD, of Buffalo, in the county of Erie and State of New York, have invented certain new and useful Improvements in Steering Mechanism for Road Freight-Cars; and I do hereby declare the following to be a full, clear, and exact description of the invention, such as will enable others skilled in the art to which it appertains to make and use the same.

In the transportation of heavy freight by a train of road cars or wagons, each carrying between twelve and fifteen tons of freight, it is frequently necessary that the train be moved in reverse order so that a car or cars at or near the normal rear end of the train may be properly positioned to receive or discharge freight. This requires that the steering of the train be accomplished from what is now the forward end of the otherwise rear car. This steering is effected by shifting the carrying wheels. Owing to the great weight these cars are required to carry, they are, necessarily, made of very heavy material, and it is essential that the carrying wheels be mounted on extra heavy axles and that the latter be pivotally connected to the bodies by king bolts.

The object of my invention is to provide simple and inexpensive means for enabling the carrying wheels and their axle to be easily and readily shifted with the expenditure of but little energy so that the direction of travel of a backing train of heavy road freight cars may be controlled at the end remote from the engine.

My invention contemplates the employment of a lever to be fulcrumed on one member of the fifth wheel and to engage the other member of the fifth wheel, and it further contemplates the provision of a long lever so that upon the application of comparatively little power to the outer end of the lever the heavy axle and carrying wheels may be shifted in either direction. Preferably the lever is detachable and carried on the side of the car when not in use.

The invention will be hereinafter fully set forth and particularly pointed out in the claims.

In the accompanying drawings, Figure 1 shows a road freight car or wagon constructed in accordance with my present improvement. Fig. 2 is an enlarged fragmentary plan view of the steering means. Fig. 3 is a longitudinal sectional view on line 3—3, Fig. 1.

Referring to the drawings, 1 designates the car or wagon body; 2 the carrying wheels; 3 the axle; and 4 the bolster to which the axle is pivoted, at its center, by a king bolt 5. Inasmuch as both axles are equipped alike the description of one will apply to the other. Surrounding the king bolt is the fifth wheel which is composed of corresponding upper and lower members, 6 and 7. These are shown as continuous circles, the upper one being braced and bolted to the bolster and the lower one similarly secured to the axle. I have shown the lower member 7 as provided with a lateral projection 8 which, in the present instance, is represented in the form of a curved bar fixedly secured at its ends to the underside of member 7 and as slightly deflected so as to occupy the same plane as the upper member 6. The latter is provided at a point in line, longitudinally of the car, with the king bolt 5, with an upwardly projecting bolt or headed stud 9 which forms a fulcrum for a long lever 10, which lever is shown as having at its inner end a forked plate 12 which permits it to be readily placed in engagement with stud 9, the fingers of the plate passing beneath the head of the stud and a guard 13. This lever, at a point a short distance outward from its engagement with stud 9, is provided with a vertical opening through which is passed a pin 14 for pivotally locking the lever to the lateral projection 8 of the lower member of the fifth wheel. The fulcrum of the lever on the upper member of the fifth wheel and its point of locking to the lower member are in direct line with the king-bolt when the wheels and their axle are positioned for direct travel. When it is desired to shift the carrying-wheels and their axles relatively to the car body, and thus control the direction of travel, the operator bears laterally on the outer end of the long lever, thereby shifting the lower member of the fifth wheel, the axle and the carrying-wheels, the fulcrum of the lever remaining in line with the king bolt of the axle. But very little energy is required to bring about this result. This is due to the long lever and the comparatively short distance between the fulcrum thereof on one member of the fifth wheel and the point of connection with the other member. When not in use the lever is readily detachable by withdrawing locking pin 14, and it is preferably carried on the side of the car. Ordinarily the distance beyond the point of locking the lever to the fifth wheel of the axle is several times greater than the distance between such point and the fulcrum of the lever on the fifth wheel of the car body. Preferably this difference is in the ratio of four to one. By means of a lever ten feet long a person can, with one hand, at a point a few feet from the car, control the direction of travel of a car carrying twenty tons or more with even greater ease than the same can be controlled by a pair of powerful horses hitched directly to a pole extending from the axle.

I claim as my invention:

1. In a reversible road freight car or wagon, the combination of a body, a centrally pivoted axle, carrying wheels thereon, a fifth wheel carried by the axle, a bodily detachable lever fulcrumed on the car body at a point beyond the pivot of the axle, and means for detachably locking said lever to the fifth wheel to enable said axle and carrying wheels to be shifted relatively to the car-body, the point of locking the lever to the fifth wheel being close to the fulcrum of the lever.

2. In a reversible road freight car or wagon, the combination of a body, centrally pivoted axles, carrying wheels thereon, fifth wheels carried by the axles, a bodily detachable lever designed to be fulcrumed on the car-body at either end thereof at a point beyond the pivot of the adjacent axle and to project some distance horizontally therefrom, and means for detachably locking said lever to the fifth wheel at a point near to the fulcrum of the lever to enable said axle and wheels to be shifted relatively to the car-body.

3. In a reversible road freight car or wagon, the combination of a body, a centrally-pivoted axle, carrying wheels thereon, a fifth wheel composed of two parts, one secured to the axle and having a lateral projection, and the other part secured to the car body, a bodily detachable lever designed to be fulcrumed on the latter member at a point beyond the pivot of the axle, and means for detachably locking the lever to said projection of the axle-member of the fifth wheel.

4. In a reversible road freight car or wagon, the combination of a body, a centrally-pivoted axle, carrying wheels thereon, a fifth wheel composed of upper and lower circular members, one secured to the body and the other to the axle, a bar secured to said lower member and bent to occupy the plane of the upper member, a stud projecting from said upper member, a lever having a forked end for engaging said stud, said lever having an opening near said forked end and a pin designed to be passed through said opening for locking said lever to said bar.

5. In a reversible road freight car or wagon, the combination of a body, a centrally pivoted axle, carrying wheels thereon, a fifth-wheel composed of two parts, one secured to the body and the other to the axle, and both pivoted concentrically to the pivot of the axle, and a detachable lever fulcrumed to one part of the fifth-wheel and engaging the other part for turning one of them relatively to the other.

In testimony whereof, I have signed this specification in the presence of two subscribing witnesses.

MARQUIS J. TODD.

Witnesses:
   Francis S. Maguire,
   John A. Murphy.